US008833120B2

(12) United States Patent
Collins et al.

(10) Patent No.: US 8,833,120 B2
(45) Date of Patent: Sep. 16, 2014

(54) LOCKING MECHANISM WITH INTEGRAL EGRESS RELEASE

(75) Inventors: Dale M. Collins, Colorado Springs, CO (US); Nathanael S. Murphy, Colorado Springs, CO (US); James D. Ohl, Colorado Springs, CO (US); Brian K. Roth, Elbert, CO (US)

(73) Assignee: Schlage Lock Company LLC, Indianapolis, IN (US)

( * ) Notice: Subject to any disclaimer, the term of this patent is extended or adjusted under 35 U.S.C. 154(b) by 6 days.

(21) Appl. No.: 13/414,796

(22) Filed: Mar. 8, 2012

(65) Prior Publication Data

US 2013/0233033 A1 Sep. 12, 2013

(51) Int. Cl.

| | |
|---|---|
| ***B60R 25/02*** | (2013.01) |
| ***E05B 3/00*** | (2006.01) |
| ***E05B 3/08*** | (2006.01) |
| ***E05B 1/00*** | (2006.01) |

(52) U.S. Cl.
USPC ......... 70/224; 70/223; 292/336.3; 292/336.5; 292/347

(58) Field of Classification Search
USPC .............. 70/224, 223, 209; 292/336.3, 336.5, 292/347
See application file for complete search history.

(56) References Cited

U.S. PATENT DOCUMENTS

| | | | | |
|---|---|---|---|---|
| 1,207,123 | A | 12/1916 | Arsneau | |
| 2,582,237 | A | 1/1952 | Dall | |
| 4,363,227 | A | 12/1982 | Lo | |
| 4,648,639 | A | 3/1987 | Martin et al. | |
| 5,657,653 | A * | 8/1997 | Hensley et al. | 70/224 |
| 5,820,177 | A | 10/1998 | Moon | |
| 6,141,998 | A * | 11/2000 | Seo | 70/224 |
| 6,351,976 | B1 | 3/2002 | Chen | |
| 6,357,270 | B1 | 3/2002 | Vazquez | |
| 6,584,818 | B2 | 7/2003 | Bates et al. | |
| 6,860,529 | B2 * | 3/2005 | Chong et al. | 292/169.18 |
| 7,013,687 | B2 | 3/2006 | Shedd et al. | |

(Continued)

FOREIGN PATENT DOCUMENTS

GB 2474112 A 4/2011

OTHER PUBLICATIONS

Kaba Simplex, 1000 Series Knob Pushbutton Locks, found on Jul. 8, 2011 at http://www.rclister.com/catalogue/Kaba_Simplex_Formerly_Unican.pdf, pp. 105-111, International Distribution Network, Canada, Ltd.

(Continued)

*Primary Examiner* — Christopher Boswell
*Assistant Examiner* — Eric Kurilla
(74) *Attorney, Agent, or Firm* — Michael Best & Friedrich LLP

(57) ABSTRACT

A locking mechanism for a door includes an outside actuator, an inside actuator, and a housing removably fixed to the door. A locking bar is selectively engageable with the housing. A first cam member is operable to move the locking bar from an unlocked position wherein the locking bar is released from the housing and a locked position wherein the locking bar is fixedly coupled to the housing. A spindle is rotatably coupled to the inside actuator and selectively coupled to the outside actuator. A second cam member is coupled to the first cam member and to the spindle and operable to move the locking bar from the locked position to the unlocked position in response to rotation of the inside actuator from a neutral position to one of a first clockwise position and a second counterclockwise position.

15 Claims, 18 Drawing Sheets

(56) References Cited

U.S. PATENT DOCUMENTS

| | | | | |
|---|---|---|---|---|
| 7,377,076 | B2 | 5/2008 | Shedd | |
| 7,934,754 | B2 * | 5/2011 | Mathachan | 292/347 |
| 2001/0028172 | A1 | 10/2001 | Bates et al. | |
| 2002/0117867 | A1 | 8/2002 | Bates et al. | |
| 2003/0107223 | A1 | 6/2003 | Chong et al. | |
| 2004/0237608 | A1 | 12/2004 | Chen | |
| 2009/0056391 | A1 * | 3/2009 | Mathachan | 70/91 |
| 2009/0056392 | A1 | 3/2009 | Brannaman et al. | |
| 2009/0151407 | A1 | 6/2009 | Lin | |

OTHER PUBLICATIONS

PCT/US2013/028994 International Search Report and Written Opinion dated Jun. 17, 2013 (8 pages).

* cited by examiner

LOCKING MECHANISM WITH INTEGRAL EGRESS RELEASE

BACKGROUND

The present invention relates to a device and method for achieving egress release of a locking mechanism at approximately the same angle of operation regardless of rotational direction.

Many locksets remain locked upon egress such that a user must unlock the door upon exiting a room or structure if he intends to return without using a key.

SUMMARY

In one embodiment of a locking mechanism for a door, the locking mechanism includes an outside actuator, an inside actuator, and a housing removably fixed to the door. A locking bar is selectively engageable with the housing. A first cam member is operable to move the locking bar from an unlocked position wherein the locking bar is released from the housing and a locked position wherein the locking bar is fixedly coupled to the housing. A spindle is rotatably coupled to the inside actuator and selectively coupled to the outside actuator. A second cam member is coupled to the first cam member and to the spindle and operable to move the locking bar from the locked position to the unlocked position in response to rotation of the inside actuator from a neutral position to one of a first clockwise position and a second counterclockwise position.

In another embodiment of a locking mechanism for a door having an inside actuator, the locking mechanism includes a housing and a locking bar selectively moveable between a locked position wherein the locking bar is fixedly coupled to the housing and an unlocked position wherein the locking bar is released from the housing. A turn button is disposed in the inside actuator and a plunger bar coupled to the turn button. A first cam member is coupled to the plunger bar and includes a sloped surface that translates the locking bar from the unlocked position to the locked position in response to movement of the turn button. A second cam member is selectively engageable with the first cam member. The second cam member is further coupled to the inside actuator. The locking bar is movable from the locked position to the unlocked position in response to movement of the turn button and in response to rotation of the inside actuator from a neutral position to one of a first clockwise position and a second counterclockwise position.

In another embodiment of a locking mechanism for a door, the locking mechanism includes an actuator and a housing removably fixed to the door. A locking bar is selectively moveable between a locked position wherein the locking bar is fixedly coupled to the housing and an unlocked position wherein the locking bar is released from the housing. A rotatable member is operable to move the locking bar from the locked position to the unlocked position in response to rotation of the actuator from a neutral position to one of a first clockwise position and a second counterclockwise position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "top", "bottom", "front", "back", and other directional terms are not intended to require any particular orientation, but are instead used for purposes of description only.

Figure 1:
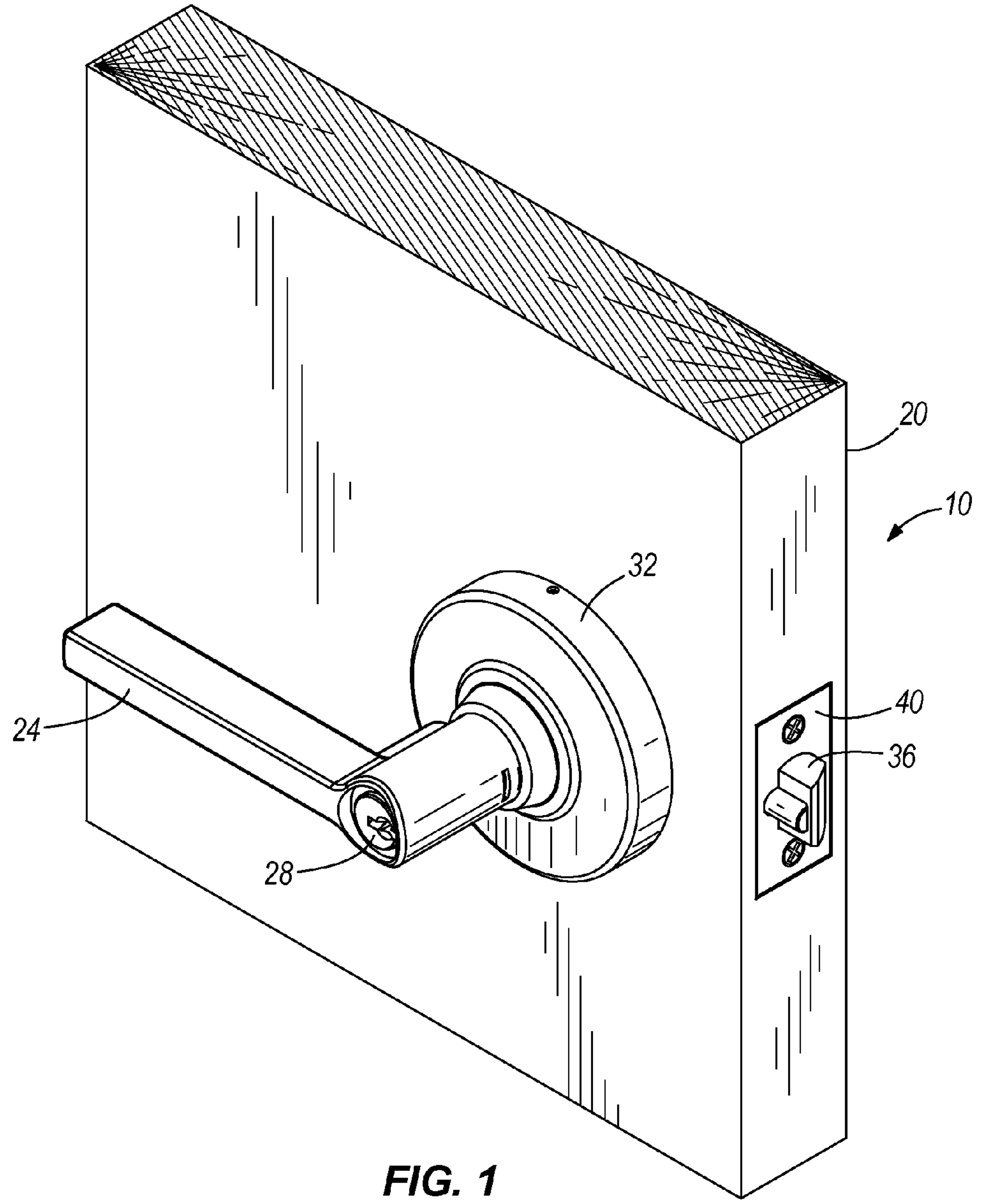
FIG. 1 is a perspective view of a lockset assembled in a door.

FIG. 1 illustrates the external portions of a lock assembly 10 mounted within a door 20. As illustrated, the lock assembly 10 includes a lever 24 housing a key cylinder 28 with an escutcheon 32 to conceal the interface of internal components of the lock assembly 10 with the door 20. A latch 36 extends through a faceplate 40 mounted in the swing side end of the door 20 adjacent an opposing door frame (not shown).

FIGS. 2*a*-3*b* illustrate the locking mechanism 100 referenced with respect to a proximal end 104 and a distal end 108. The locking mechanism 100 includes a housing 110 having a proximal face 114 adjacent an outside actuator or handle (e.g., a knob or lever, not shown) and a distal face 118. The housing 110 defines an aperture 122 having a central axis 124 therethrough that receives an outside spindle 126. The outside spindle 126 rotates from a first position to a second position in response to actuation of the outside handle to extend and retract the door latch and receives a lock cylinder (not shown) into a proximal end thereof in a manner known to those of skill in the art. Two elongated arcuate members 130, 134 extend from the distal face 118 of the housing 110 and are together shaped to contain and support the remaining components of the lock mechanism 100.

Figure 2A:
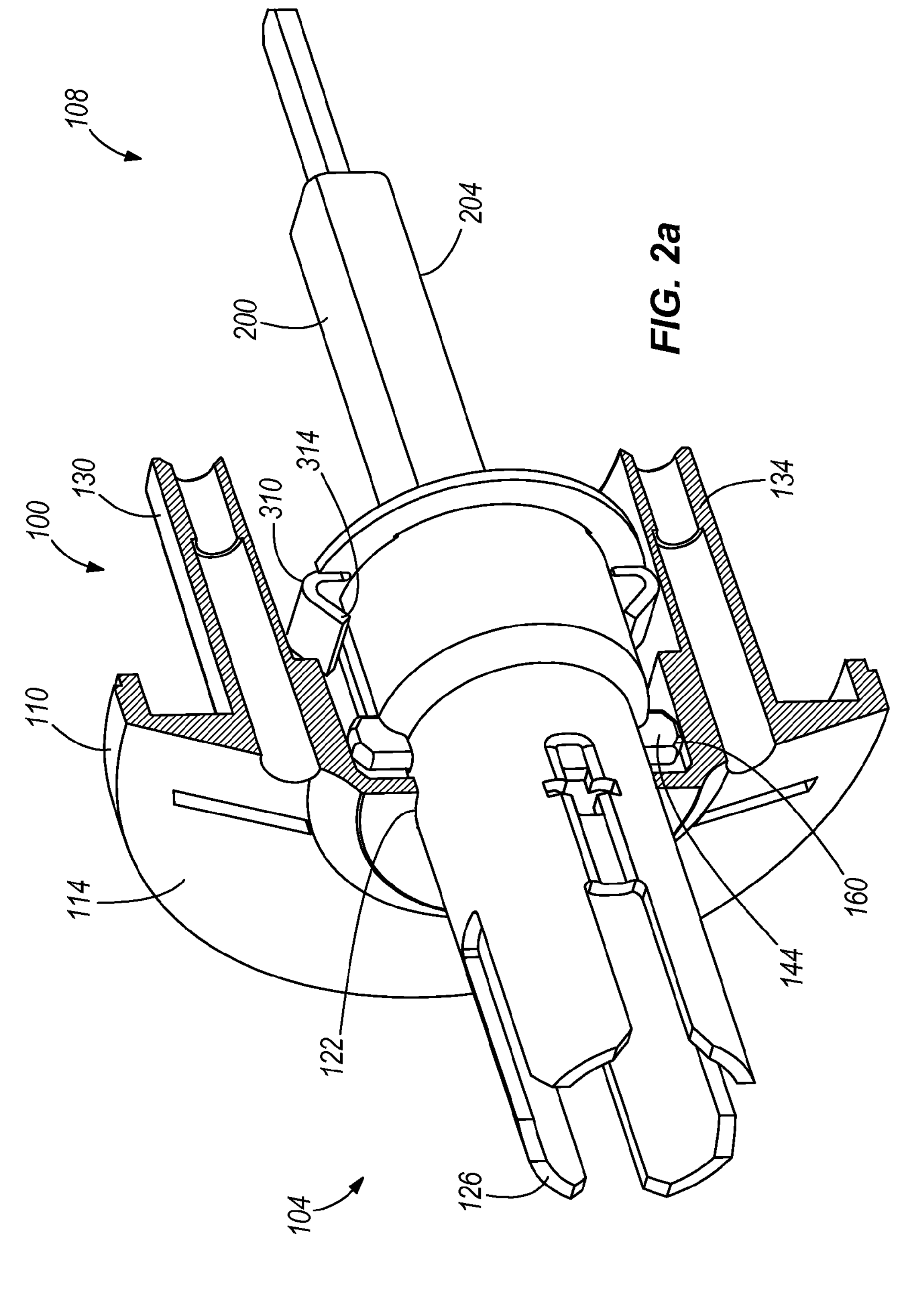
FIG. 2*a* is a partially sectioned perspective view of a lock mechanism with integral egress release.
Figure 2B:
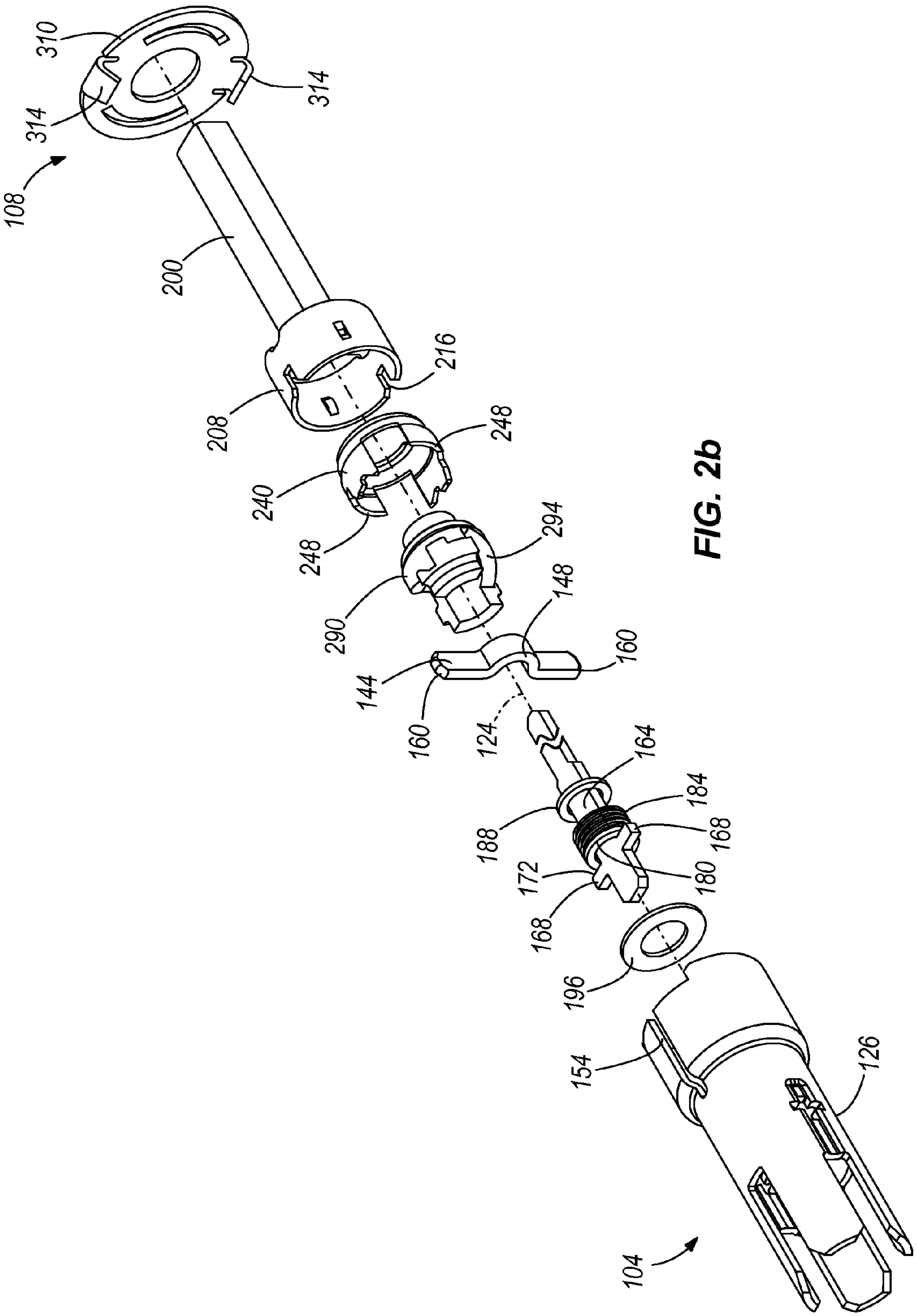
FIG. 2*b* is an exploded view of the locking mechanism illustrated in FIG. 2*a*.
Figure 3A:
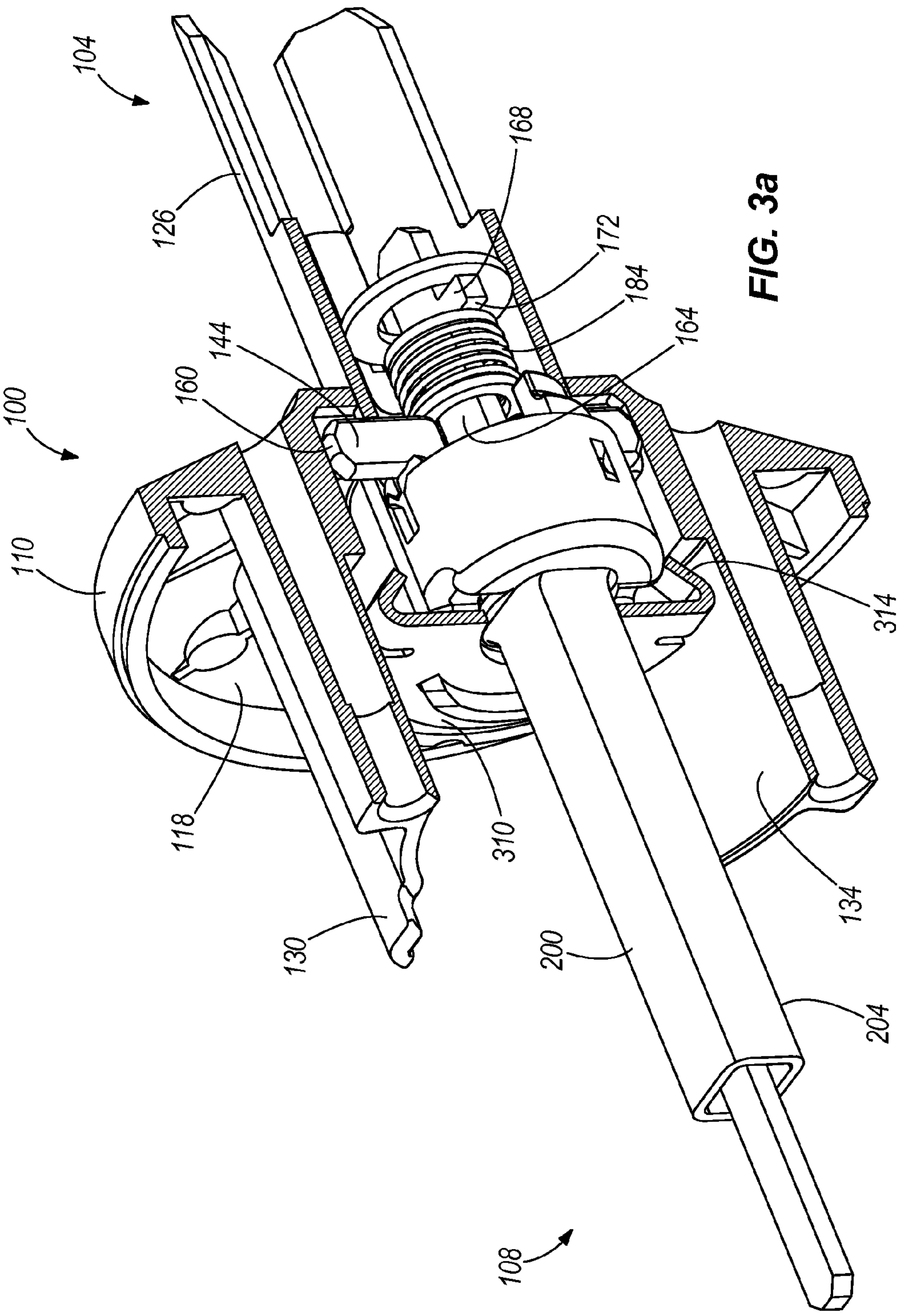
FIG. 3*a* is another partially sectioned perspective view of the lock mechanism of FIG. 2*a*.
Figure 3B:
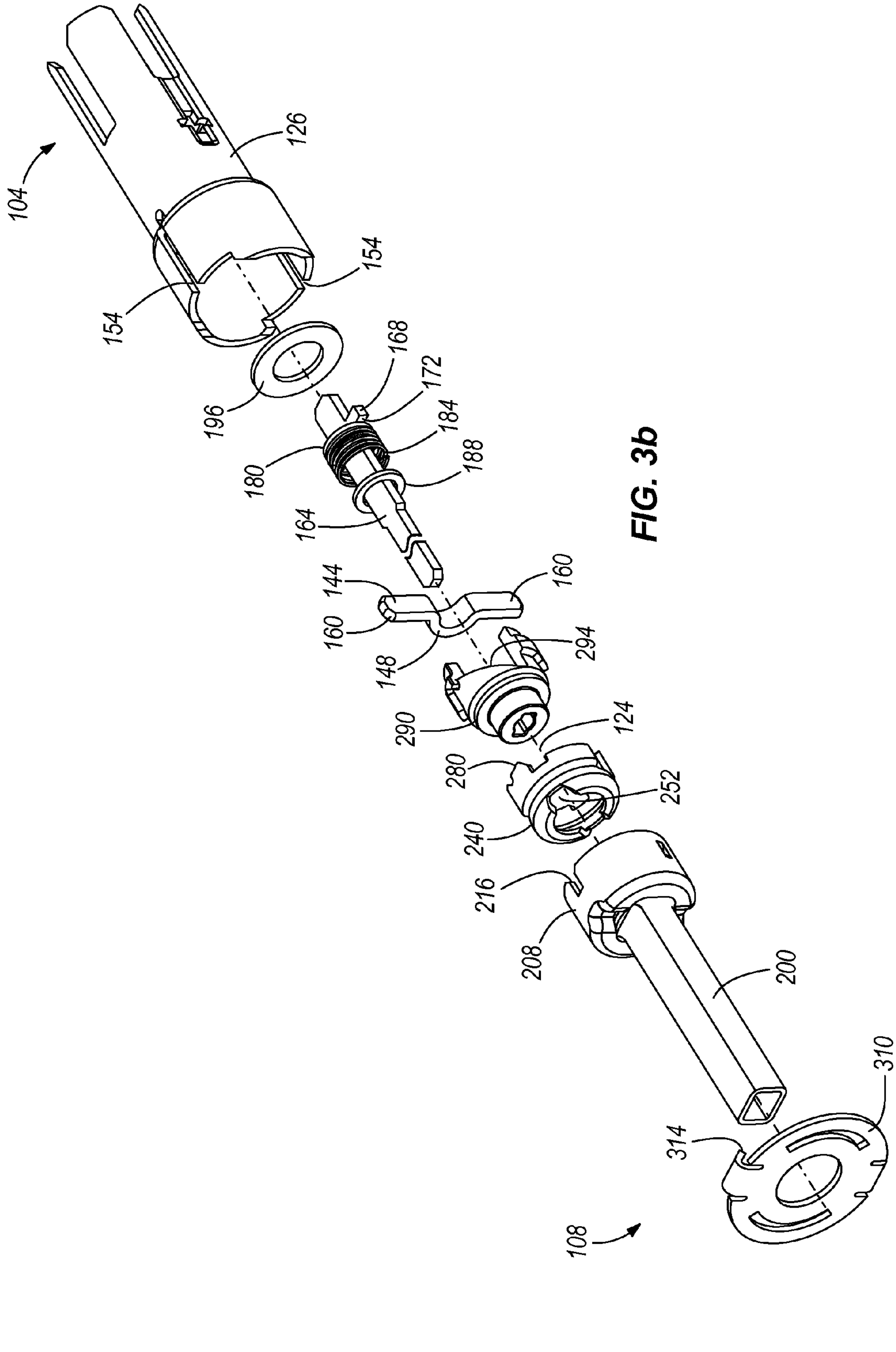
FIG. 3*b* is an exploded view of the locking mechanism illustrated in FIG. 3*a*.
Figure 4:
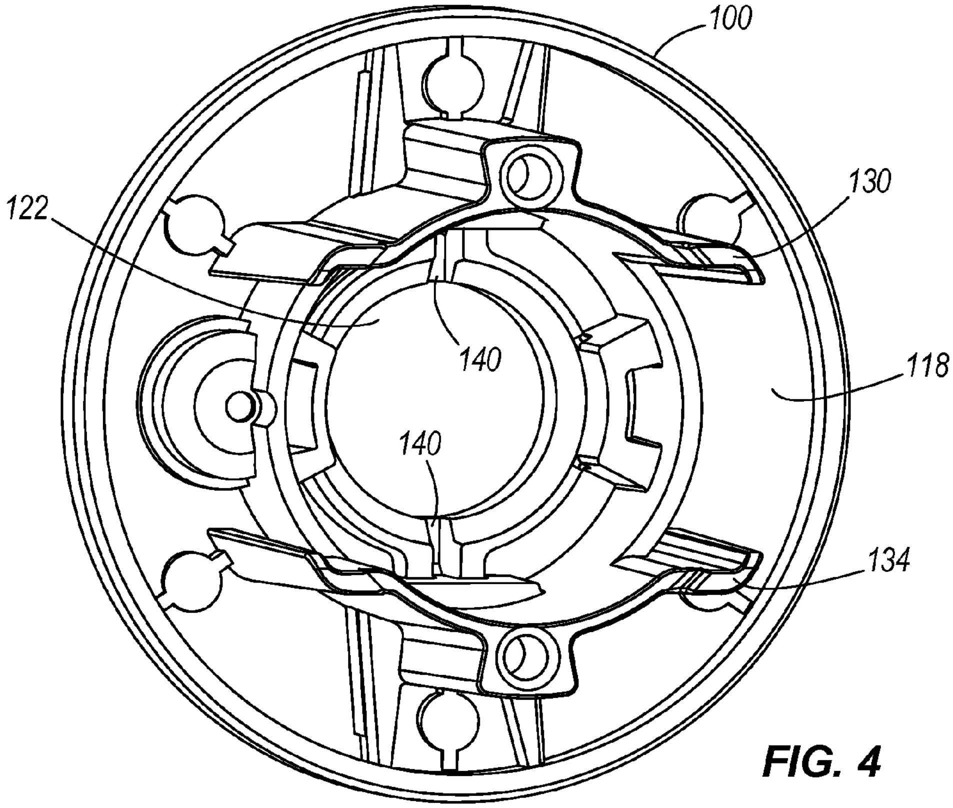
FIG. 4 is a perspective view of the housing of the locking mechanism of FIG. 2*a*.

With continued reference to FIGS. 2*a*-3*b*, a locking bar 144 is disposed perpendicularly to the central axis 124 and includes a centrally formed semicircular body 148 designed to offset the locking bar 144 from the central axis 124. The locking bar 144 translates through its entire range of travel in the axial direction within a pair of diametrically opposed channels 154 formed in the outside spindle 126. The ends 160 of the locking bar 144 cooperate with a pair of opposing slots 140 of the housing 110 (see FIG. 4). When the locking bar 144 is positioned as illustrated in FIGS. 2*a* and 3*a*, i.e., adjacent to the distal face 118 of the housing 110, the locking mechanism 100 is in a "locked" position, which impedes rotational movement of the locking bar 144, and thus the outside spindle 126, as will be further detailed. A plunger bar 164 operates about the central axis 124 and engages both the lock cylinder (not shown) received in the outside spindle 126 and a turn button 165 located within an inside actuator or handle 166. The plunger bar 164 is shaped in the form of a cross with arms 168 defining shoulders 172. The shoulders abut a first washer 180 adjacent a first end of a biasing member or spring 184, the other end of which interacts with a second washer 188 to convey the force of the spring 184 to the locking bar 144 during operation. In the present construction, the biasing spring 184 is illustrated as a linear compression spring. A plunger washer 196 provides a stop for the plunger bar 164 and rests against features in the outside spindle 126.

Figure 5:
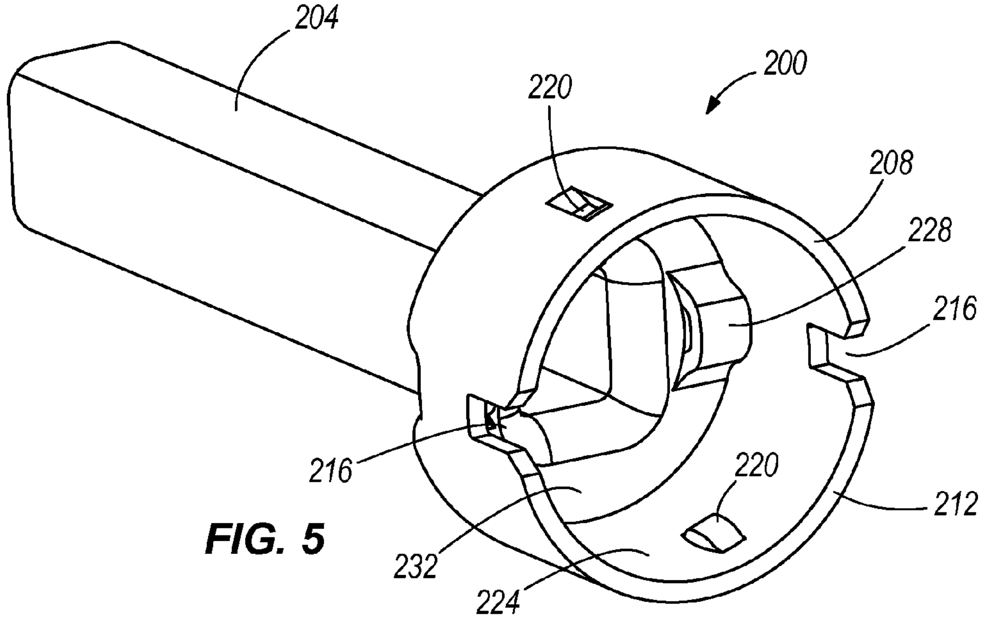
FIG. 5 is a perspective view of a latch spindle of the locking mechanism of FIG. 2*a*.

An inside latch spindle 200 operates the door latch and is driven by the inside handle (not shown) when the locking mechanism 100 is locked and by both the inside and outside handles when the locking mechanism 100 is unlocked. Referring also to FIG. 5, the latch spindle 200 includes a tubular body 204 sized to receive the plunger bar 164. An arcuate head 208 includes an edge 212 and diametrically opposed slots 216 sized to engage and cooperate with the locking bar 144 when the locking mechanism 100 is unlocked. A pair of side lances 220 extend from the inside surface 224 of the arcuate head 208. A pair of bottom lances 228 formed in the bottom surface 232 of the latch spindle protrude axially therefrom.

Figure 6:
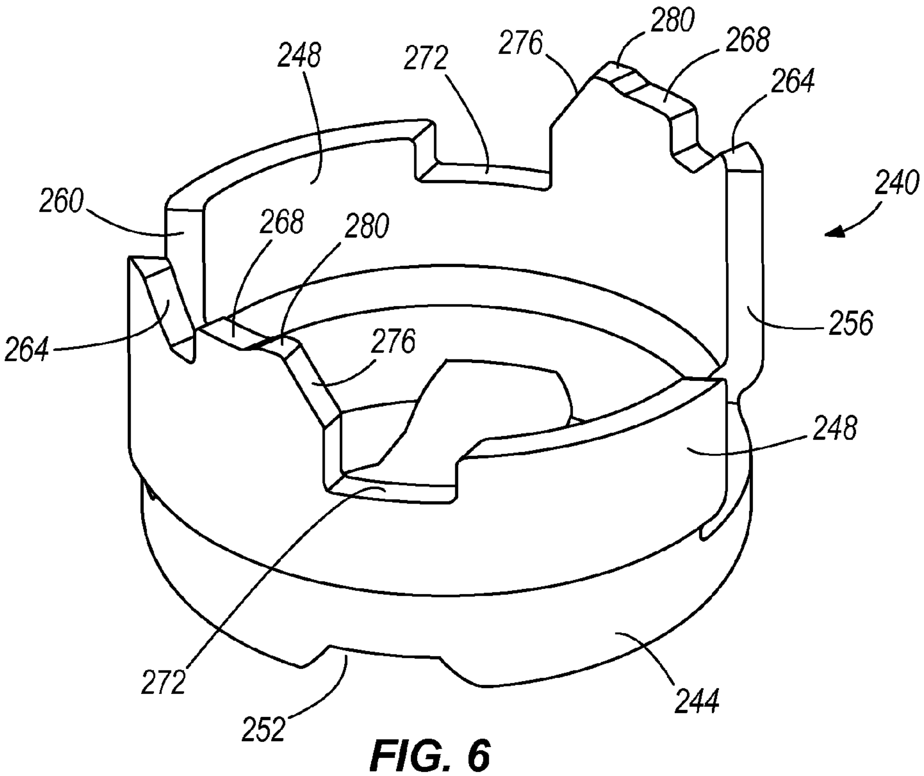
FIG. 6 is a perspective view of a first cam member of the locking mechanism of FIG. 2*a*.
Figure 7:
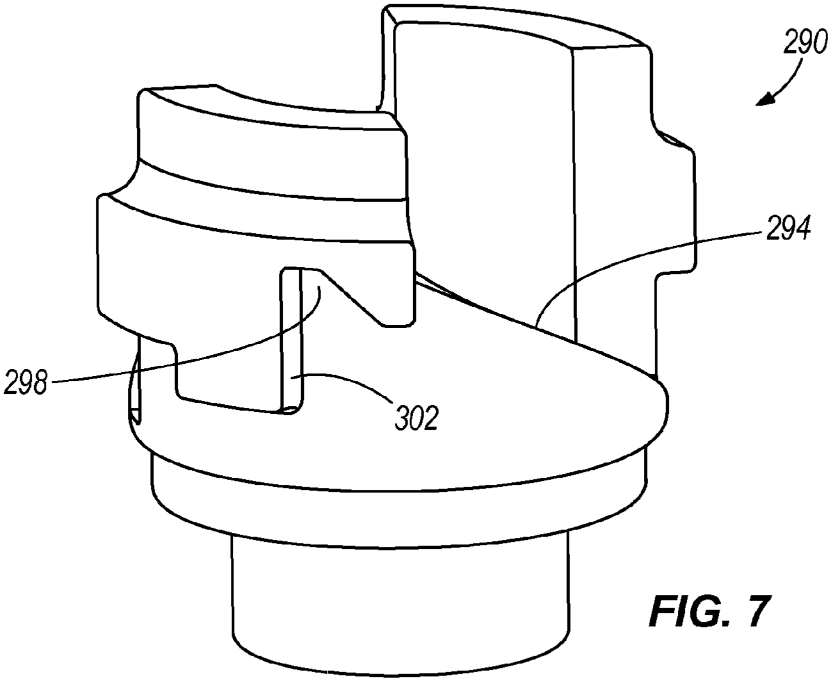
FIG. 7 is a perspective view of a second cam member of the locking mechanism of FIG. 2*a*.

With continued reference to FIGS. 2*a*-3*b* and to FIG. 6, a first cam member 240 includes a base 244 and arcuate opposing walls 248. Bottom notches 252 disposed in the base 244 cooperate with the bottom lances 228 formed in the latch spindle 200 during operation, allowing the co-rotation between the latch spindle 200 and the first cam member 240. Each of the walls 248 includes a first and second margin 256, 260 and a declination 264. A top ledge 268 supports a portion of the locking bar 144 when locked and a depression 272 provides a stopping point for the locking bar 144 when unlocked. A bevel 276 is situated between the depression 272 and a protuberance 280 adjacent the top ledge 268.

Referring to FIGS. 2*a*-3*b* and FIG. 7, a second cam member 290 actuated by the plunger bar 164 includes opposing sloped surfaces 294 that interact with the locking bar 144 during locking and unlocking. Angled notches 298, each having a side 302, operatively couple with the first cam 240 during operation, as will be further described.

Referring again to FIGS. 2*a*-3*b*, a spring cage 310, aided by hooks 314, retains the locking mechanism components previously identified into the outer spindle 126.

Figure 8B:
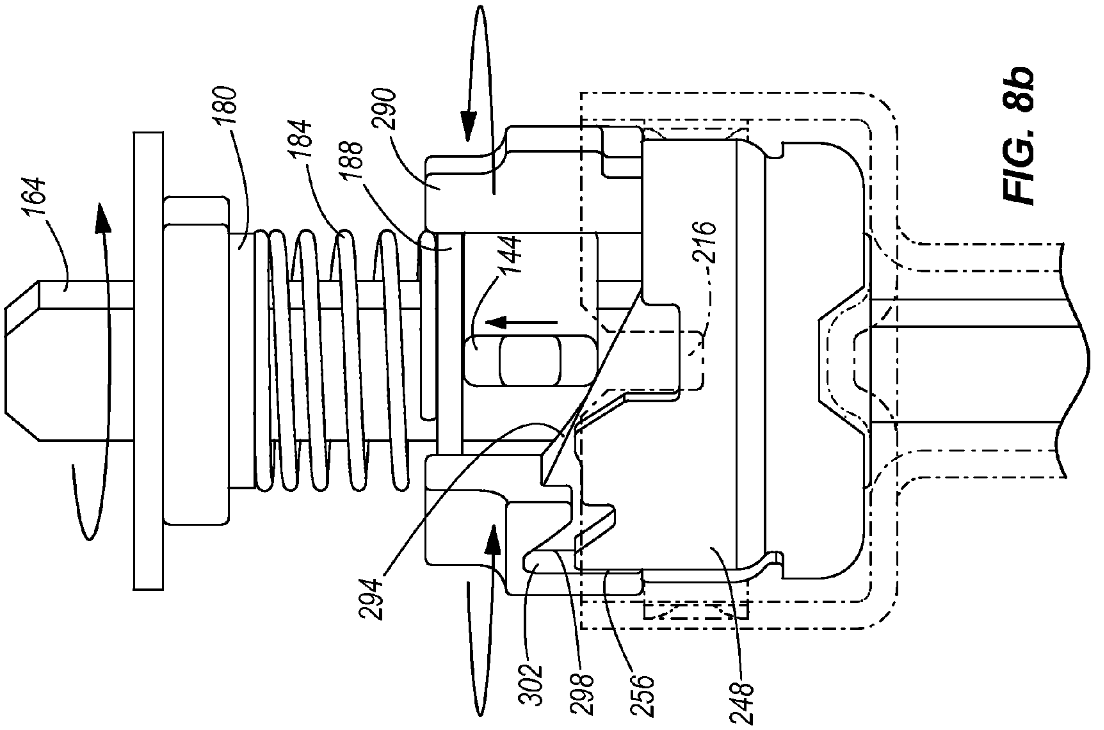
FIG. 8*b* is a side view of the locking mechanism during a locking operation by the plunger bar.
Figure 8A:
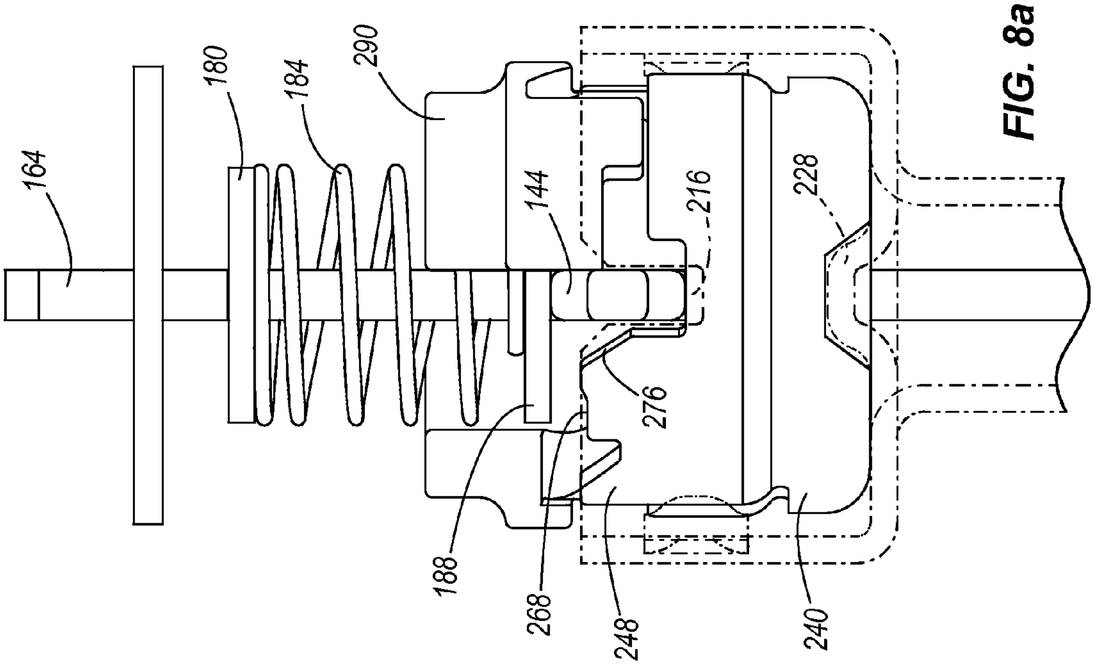
FIG. 8*a* is a side view of the locking mechanism in the unlocked position.
Figure 8C:
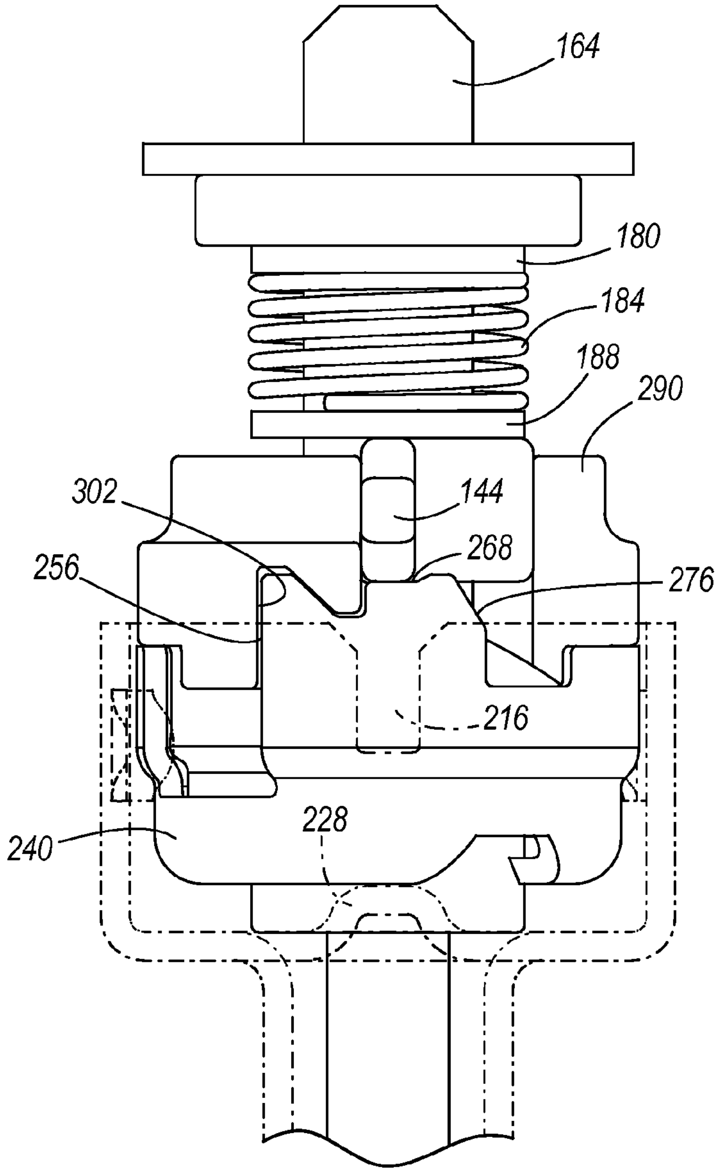
FIG. 8*c* is a side view of the locking mechanism in the locked position.

Referring to FIG. 8*a*, the locking mechanism 100 is in an unlocked state or position with components as previously identified. The plunger bar 164 is operational with the key cylinder (within the outside spindle 126) or a turn button 165 (within the inside handle 166). When either is rotated to "lock" the door, the plunger bar 164 rotates the second cam 290, as shown in FIG. 8*b*. In the illustrated embodiment, the plunger bar 164 moves clockwise with respect to the distal end of the latch spindle 200 during locking. As the second cam 290 rotates clockwise, it turns the sloped surfaces 294 into contact with the locking bar 144, driving the locking bar 144 toward the housing 110 and into engagement with the opposing slots 140 adjacent the distal face (not shown). Concurrently, the locking bar 144 withdraws from the slots 216 in the latch spindle 200 and pushes against the biasing spring 184 through the washer 188 to compress it as the sides 302 of the partially angled notches 298 in the second cam 290 contact the first margins 256 of the walls 248 of the first cam 240. Referring to FIG. 8*c*, this forces the first cam 240 against the bottom lance 228 of the latch spindle 200 and toward the locking bar 144. Aided by the bevels 276, the locking bar 144 lifts off of the sloped surfaces 294 and onto the top ledges 268, which hold the locking bar 144 in place in the locked position against the biasing force of the spring 184. The locking bar 144, engaged with the slots 140 in the housing 110 and with the channels 154 in the outside spindle 126, inhibits the outside handle from turning, thus locking the lock mechanism 100 from the outside. The inside handle 166 acting on the latch spindle 200 is free to turn to activate the latch and the egress release function of the locking mechanism 100.

Figure 9B:
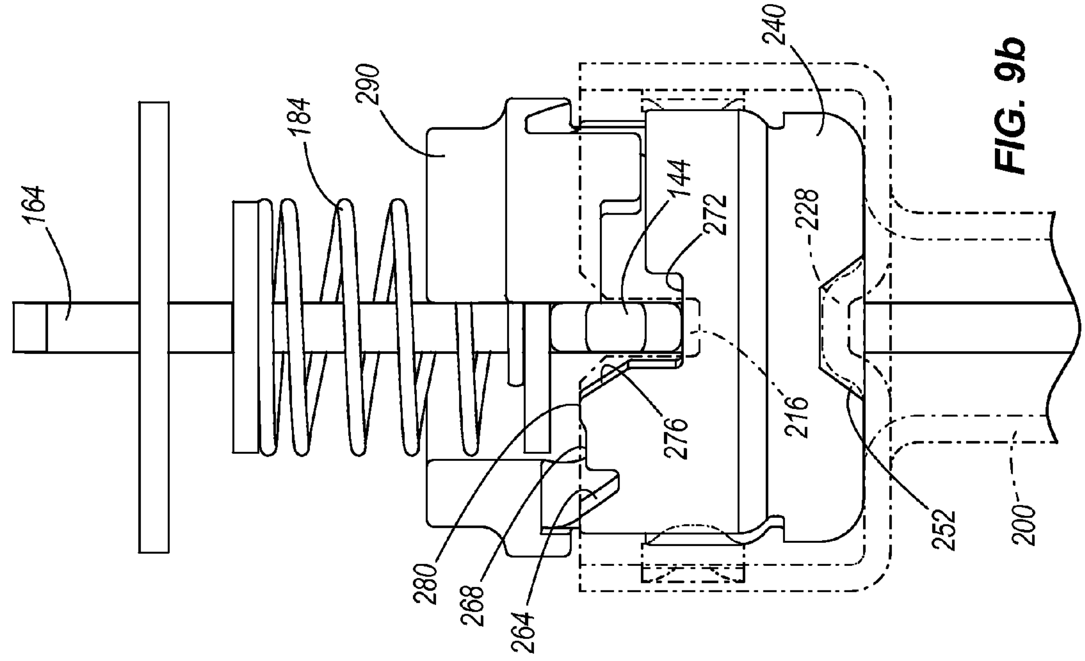
FIG. 9*b* is a side view of the locking mechanism in the unlocked position.
Figure 9A:
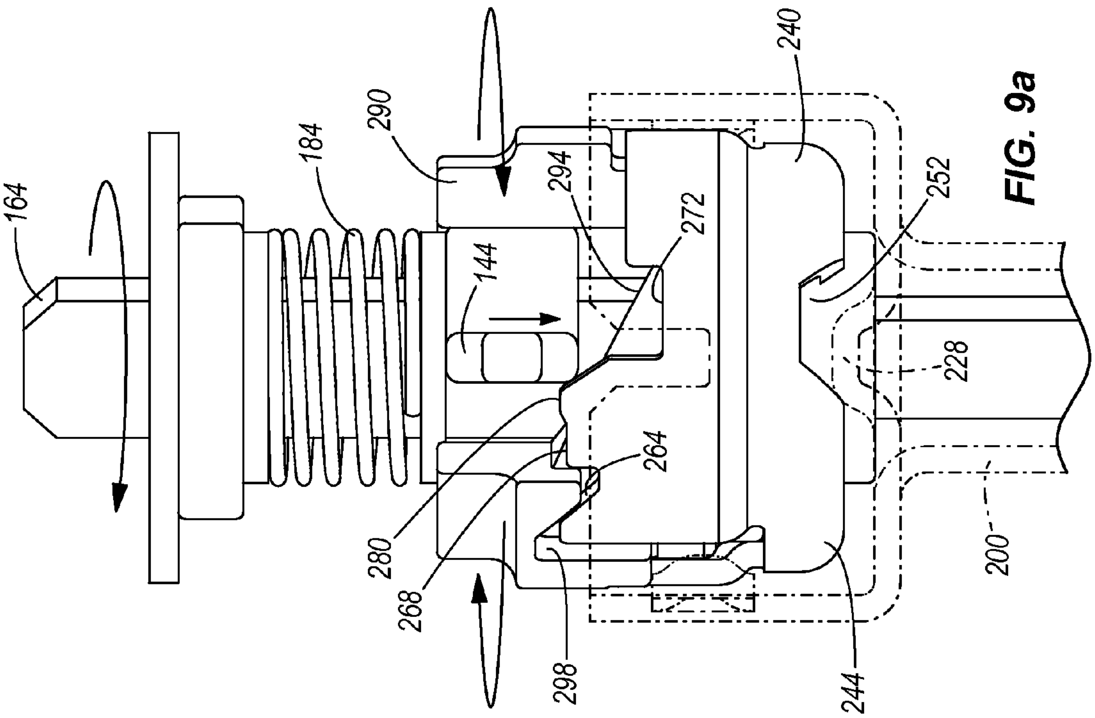
FIG. 9*a* is a side view of the locking mechanism during an unlocking operation by the plunger bar.

Referring to FIG. 9*a*, unlocking the lock mechanism 100 through the plunger bar 164 (which unlocks in a counterclockwise direction) via the key cylinder or the turn button 165 directly drives the second cam 290. The partially angled notches 298 of the second cam 290 interact with the declinations 264 of the first cam 240 to rotate the first cam 240 in a counterclockwise manner until the notches 252 in the base 244 of the first cam 240 are aligned with the bottom lances 228 of the latch spindle 200. During this movement, the top ledges 268 of the first cam 240 are rotated out of engagement with the locking bar 144 (over the protuberances 280), and the spring load of the spring 184 on the locking bar 144 forces the first cam 240 downward along the bevels 276 (which assist in reengaging the notches 252 with the bottom lances 228) and down the sloped surfaces 294 of the second cam 290 as the notches 252 mate with the bottom lances 228. In this position, the locking bar 144 is disposed within the slots 216 of the latch spindle 200 and the depression 272 of the first cam 240, as illustrated in FIG. 9*b*. With the locking mechanism 100 in the unlocked position, the outside spindle 126 is coupled to the latch spindle 200 through the locking bar 144, and the outside handle can rotate the latch spindle 200, which in turn operates the latch and turns the inside handle 166.

Figure 10B:
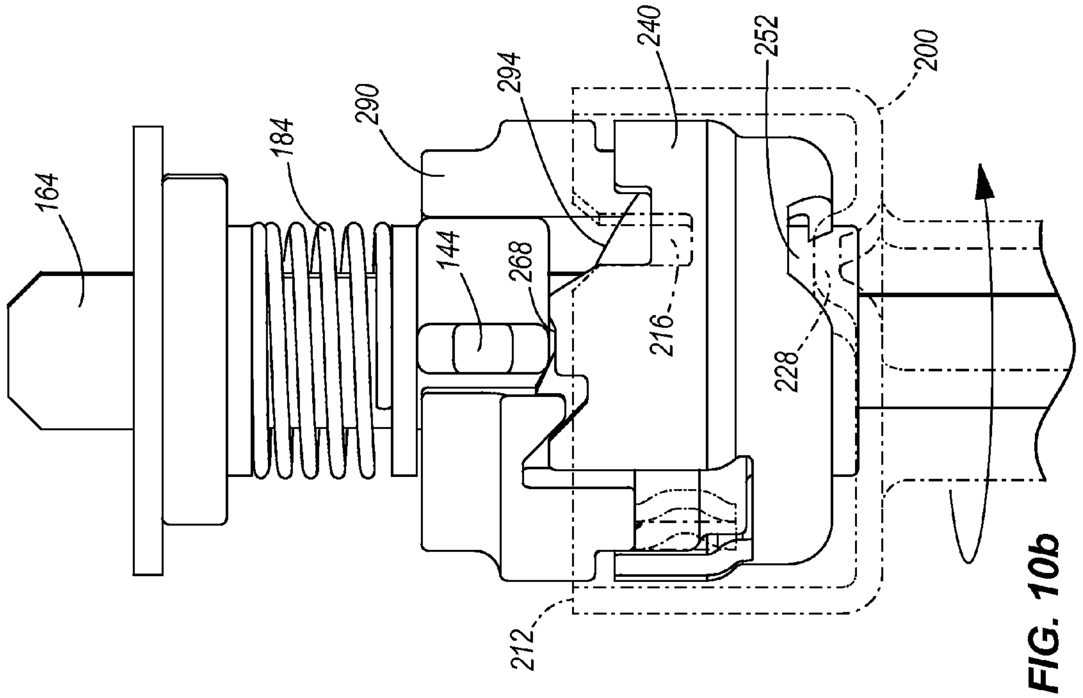
FIGS. 10*b*-10*d* are side views of the locking mechanism during the sequence of an unlocking operation by clockwise egress release.
Figure 10A:
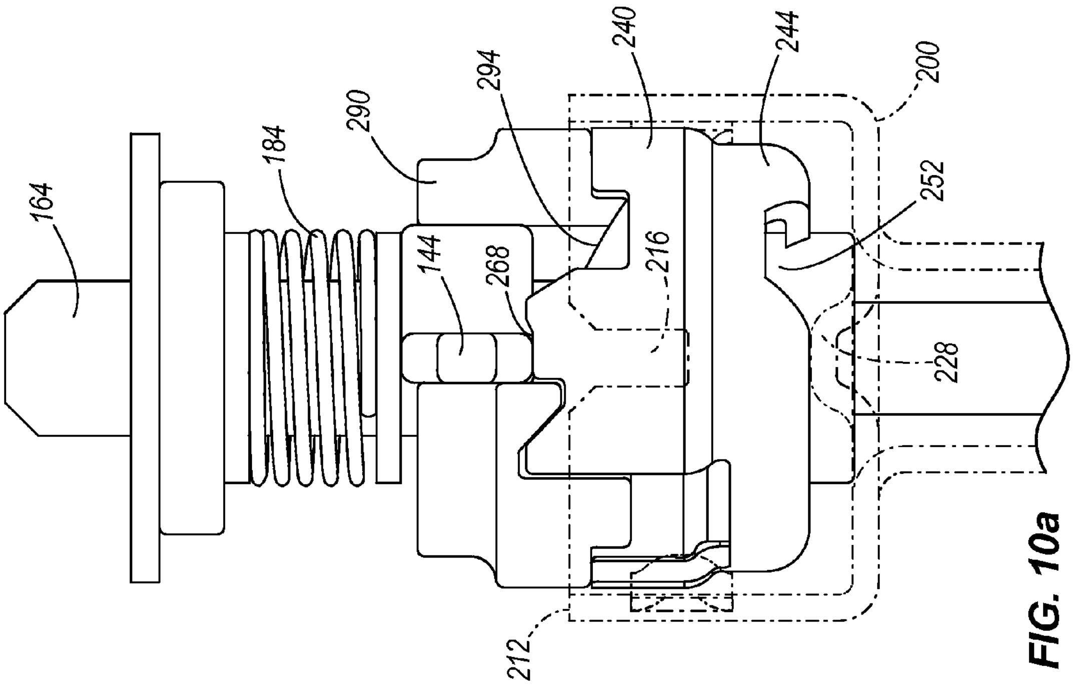
FIG. 10*a* is a side view of the locking mechanism in the locked position prior to unlocking by clockwise egress release.
Figure 10D:
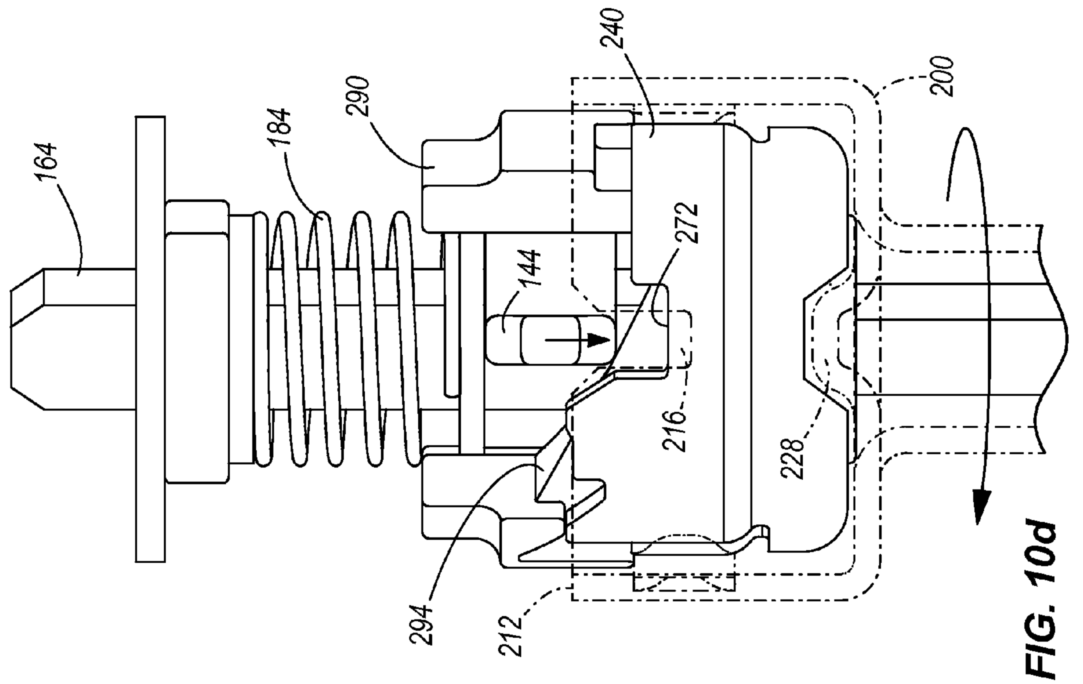
Figure 10C:
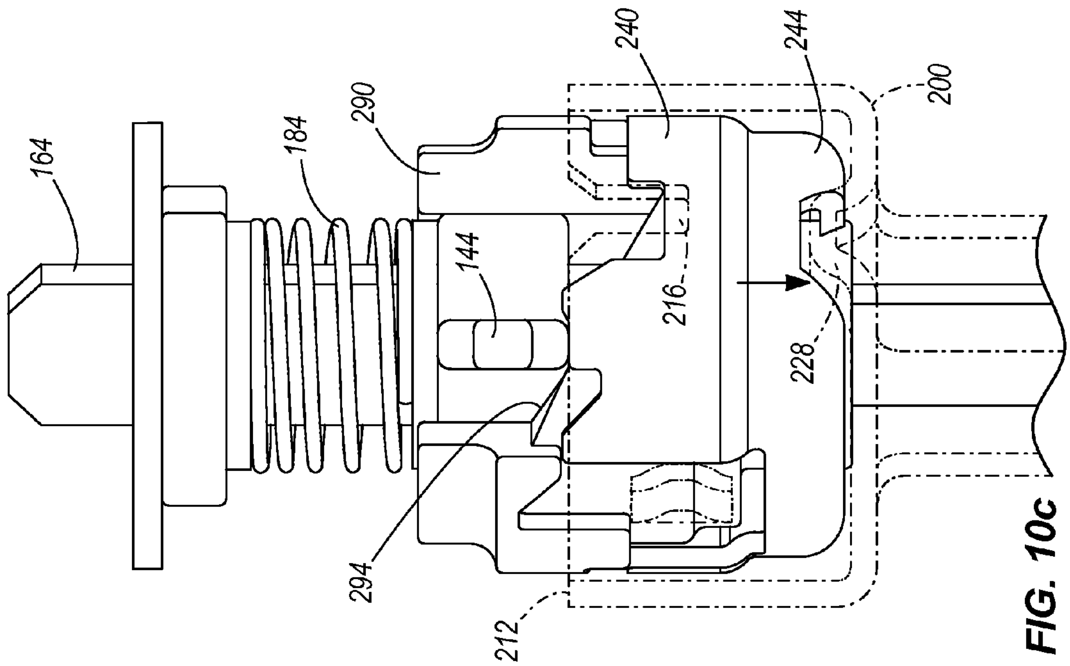

Referring to FIGS. 10*a*-10*c*, during an unlocking operation of the lock mechanism 100 by clockwise rotation of the inside handle, the latch spindle 200 is rotated clockwise. The bottom lances 228 of the latch spindle 200 align with the notches 252 in the base 244 of the first cam 240. The biasing force on the locking bar 144 due to the spring 184 acts through the top ledges 268 to force the notches 252 into engagement with the bottom lances 228. At the same time, the locking bar 144 pushes against the slopes 294 of the second cam 290 to rotate the second cam 290 counterclockwise until the locking bar 144 is positioned against the edges 212 of the latch spindle 200, as shown in FIG. 10*c*. The latch spindle 200 rotates from approximately 20 degrees to approximately 30 degrees, and more specifically rotates approximately 24 degrees from a neutral position to engage the notches 252 in the base 244. If rotated further, the latch spindle 200 carries the first cam 240 with it while the locking bar 144 remains in contact with the edges 212.

Referring to FIG. 10*d*, when the handle is released, an inside handle spring (not shown) returns the latch spindle 200 to a neutral position. As the latch spindle 200 rotates back to the neutral position carrying the first cam 240, the locking bar 144 disengages from the top ledges 212 and pushes the sloped surfaces 294, rotating the second cam 290 in a counterclockwise direction. The biasing spring 184 continues to push the second cam 290 through the locking bar 144 until the locking bar 144 is disposed within the slots 216 of the latch spindle 200 and the depressions 272 of the first cam 240 (see, e.g., FIG. 9*b*), at which point the locking mechanism 100 is unlocked.

Figure 11B:
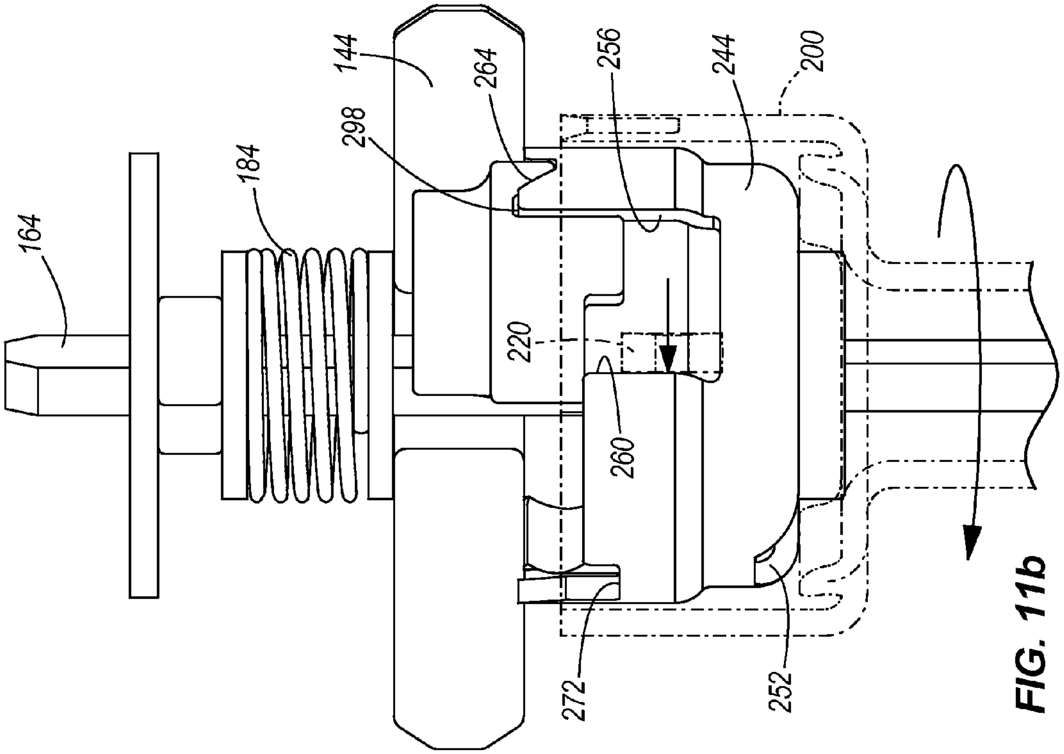
FIGS. 11*b*-11*i* are side views of the locking mechanism during the sequence of an unlocking operation by counterclockwise egress release.
Figure 11A:
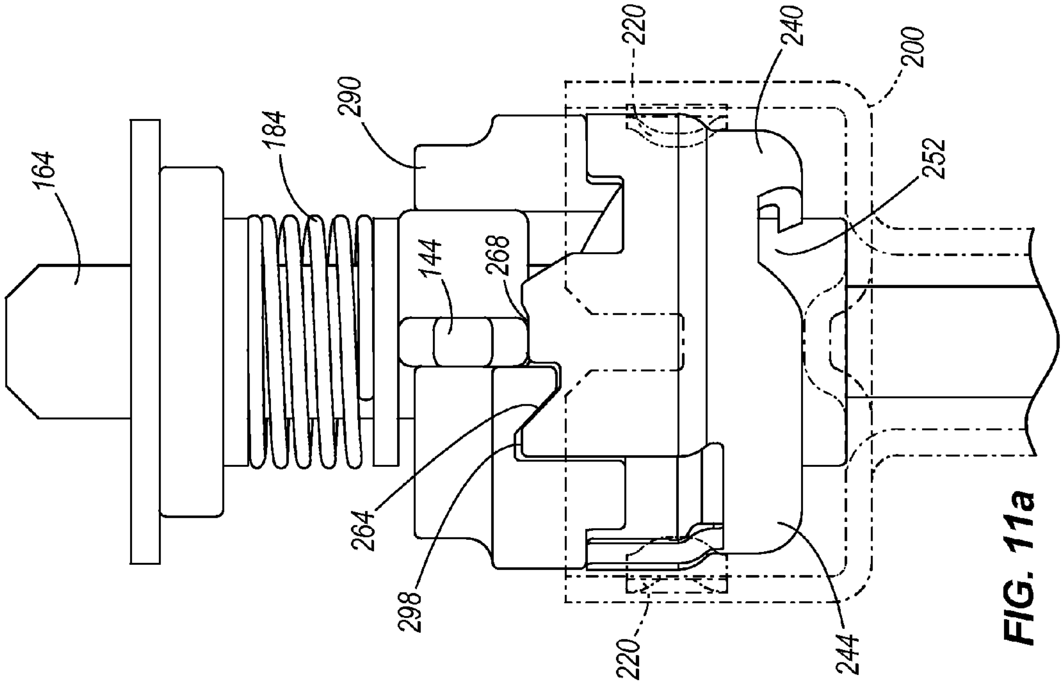
FIG. 11*a* is a side view of the locking mechanism in the locked position prior to unlocking by counterclockwise egress release.

FIG. 11*a* shows the locking mechanism 100 in the locked position, identically with that of FIGS. 8*c* and 10*a*. Referring to FIGS. 11*a* and 11*b*, during an unlocking operation of the lock mechanism 100 by counterclockwise rotation of the inside handle, the latch spindle 200 is rotated counterclockwise. The side lances 220 of the latch spindle 200 contact the second margins 260 of the first cam 240, causing the first cam 240 to turn with the latch spindle 200. With the second cam 290 engaged to the first cam 240 through the interaction of the angled notches 298 with the declinations 264, the first and second cams 240, 290 rotate in tandem and disengage the locking bar 144 from the top edges 268 of the first cam 240. The force from the biasing spring 184 moves the locking bar 144 onto the edges 212 of the latch spindle 200, as shown in FIG. 11*c*. The latch spindle 200 rotates from approximately 20 degrees to approximately 30 degrees, and more specifically rotates approximately 24 degrees from a neutral position to disengage the locking bar 144 from the top edges 268. If the latch spindle 200 is rotated further counterclockwise, the first cam 240 continues to carry the second cam 290 and the locking bar 144 remains in contact with the edges 212.

Figure 11D:
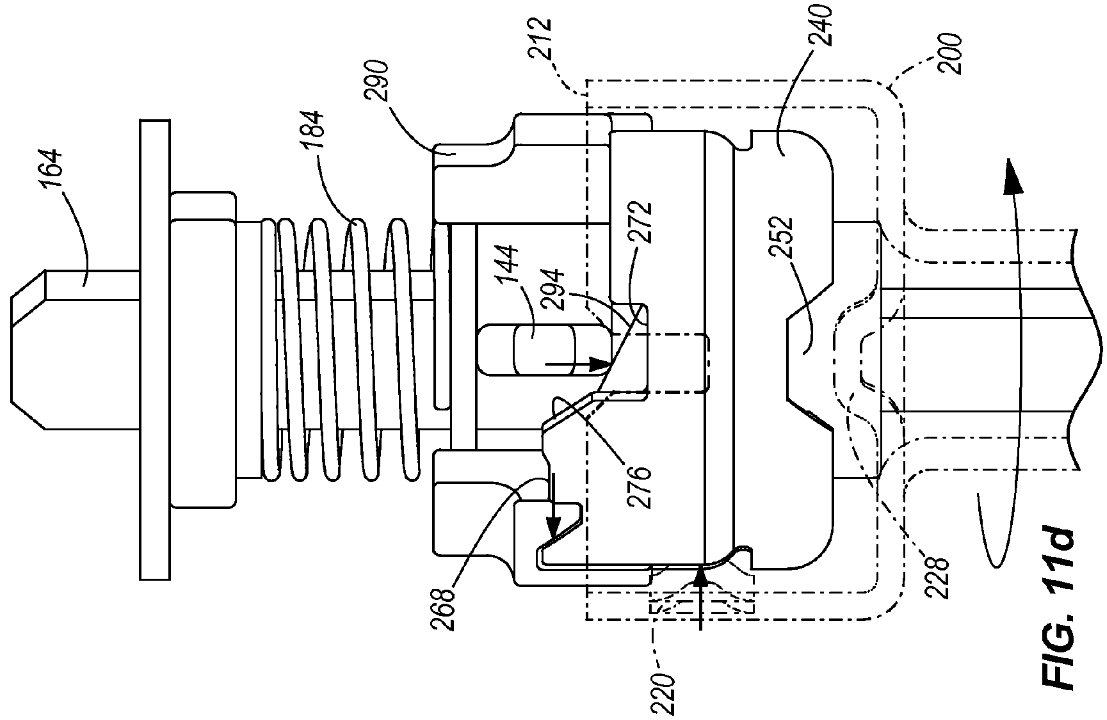
Figure 11C:
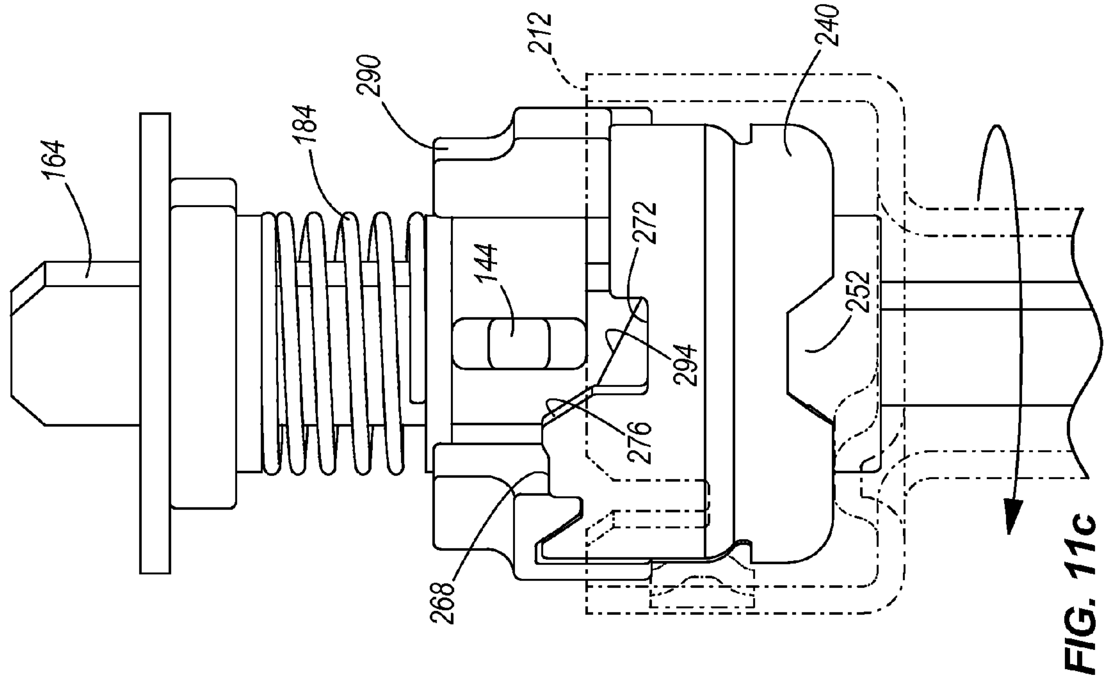
Figure 11F:
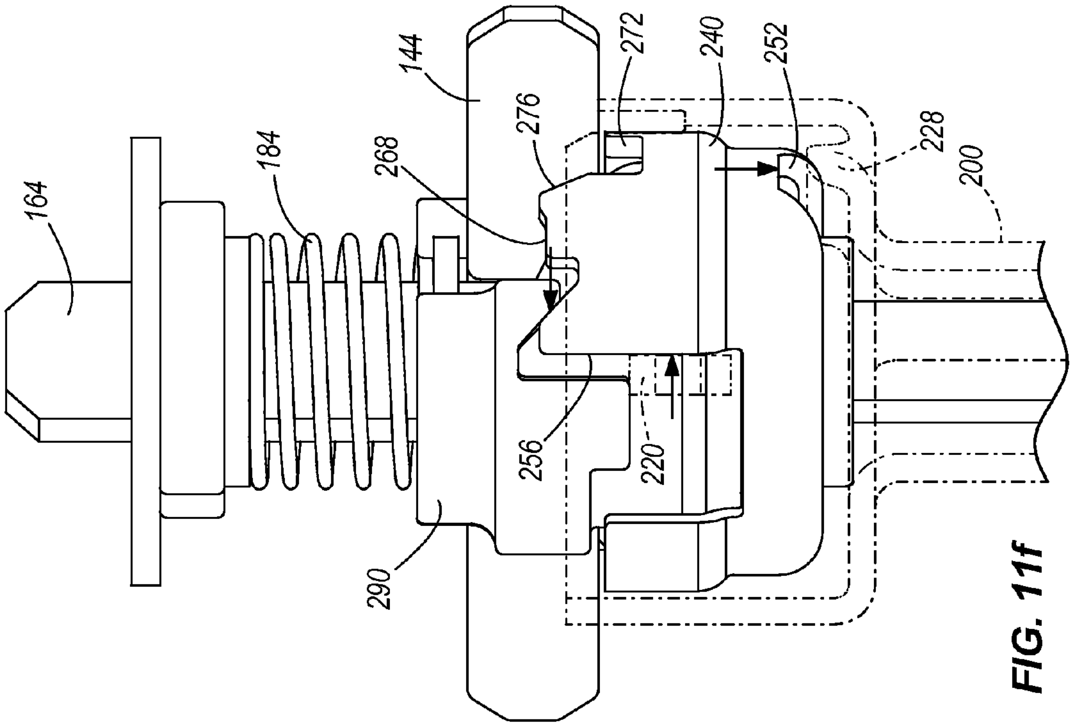
Figure 11E:
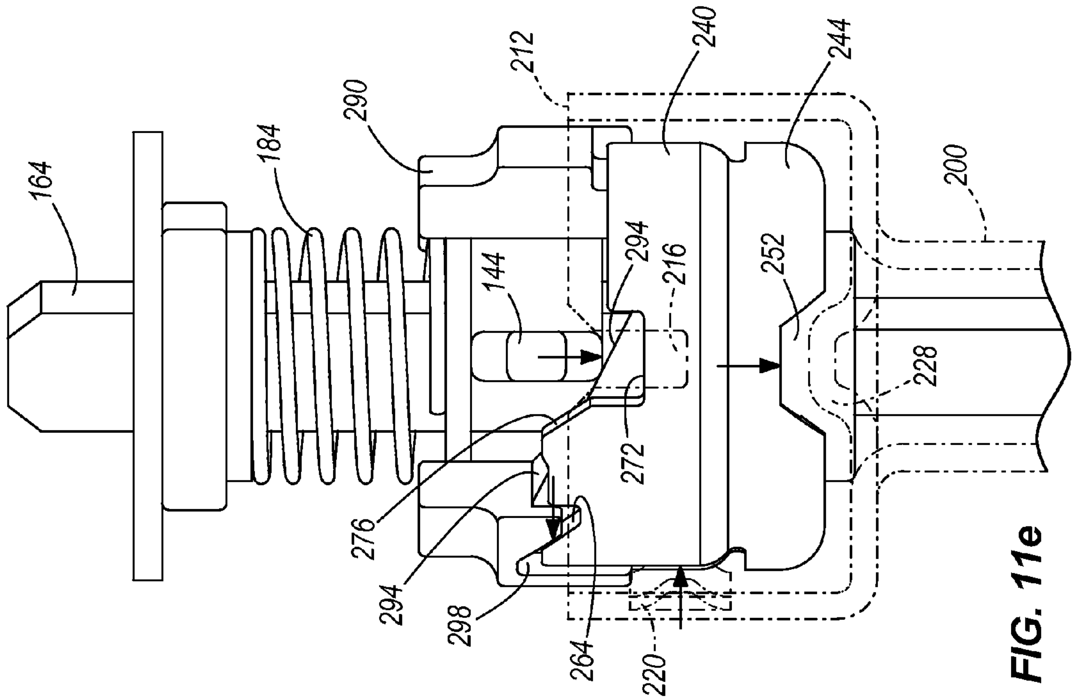
Figure 11H:
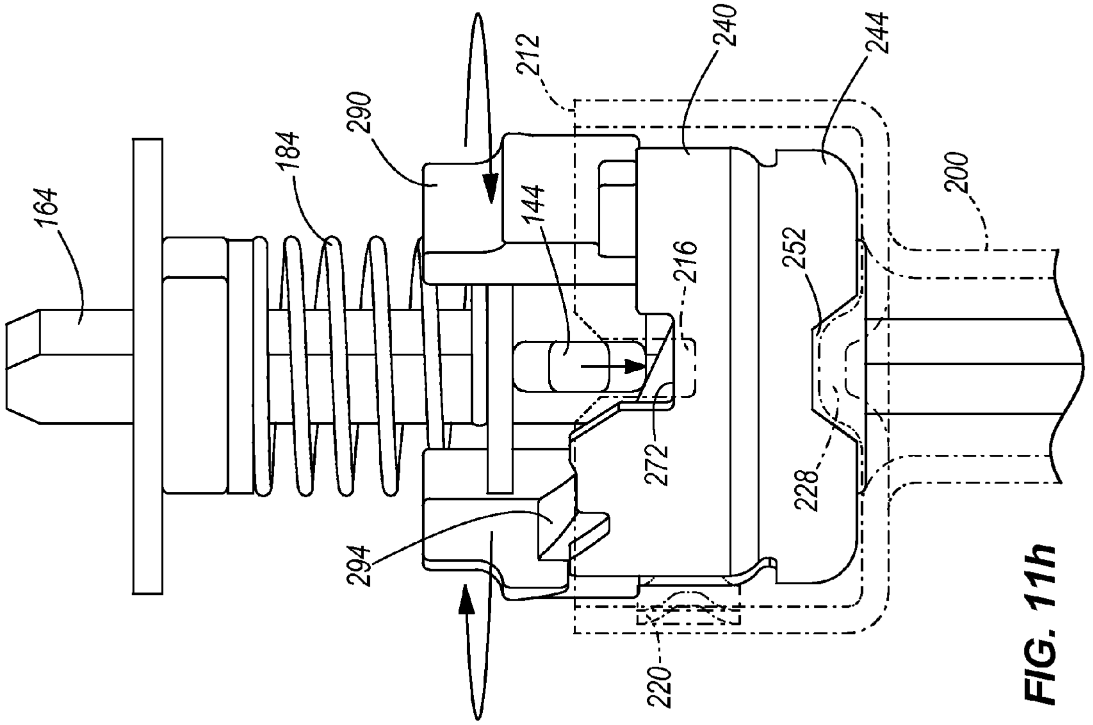
Figure 11G:
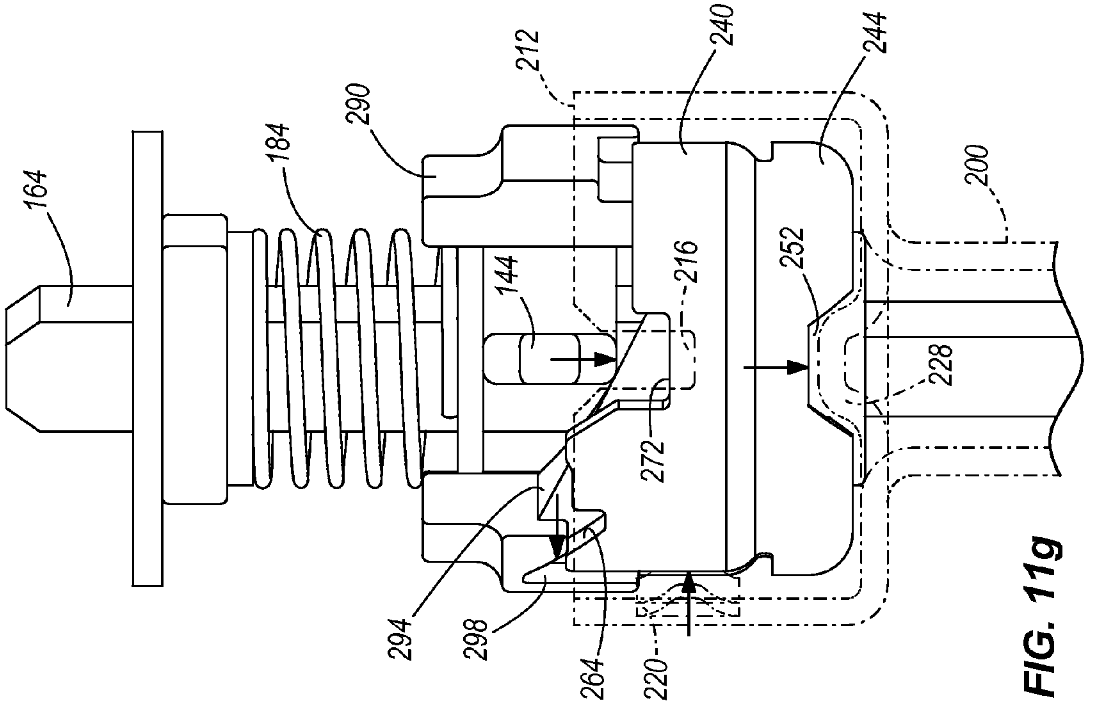
Figure 11I:
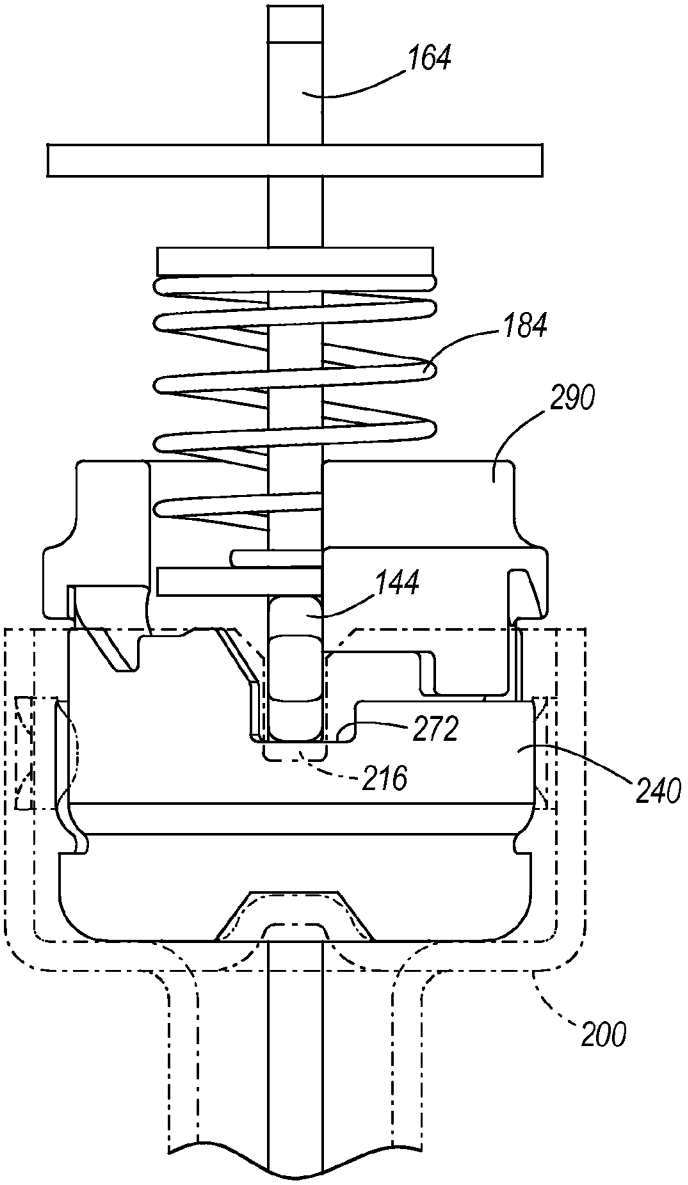
Figure 12:
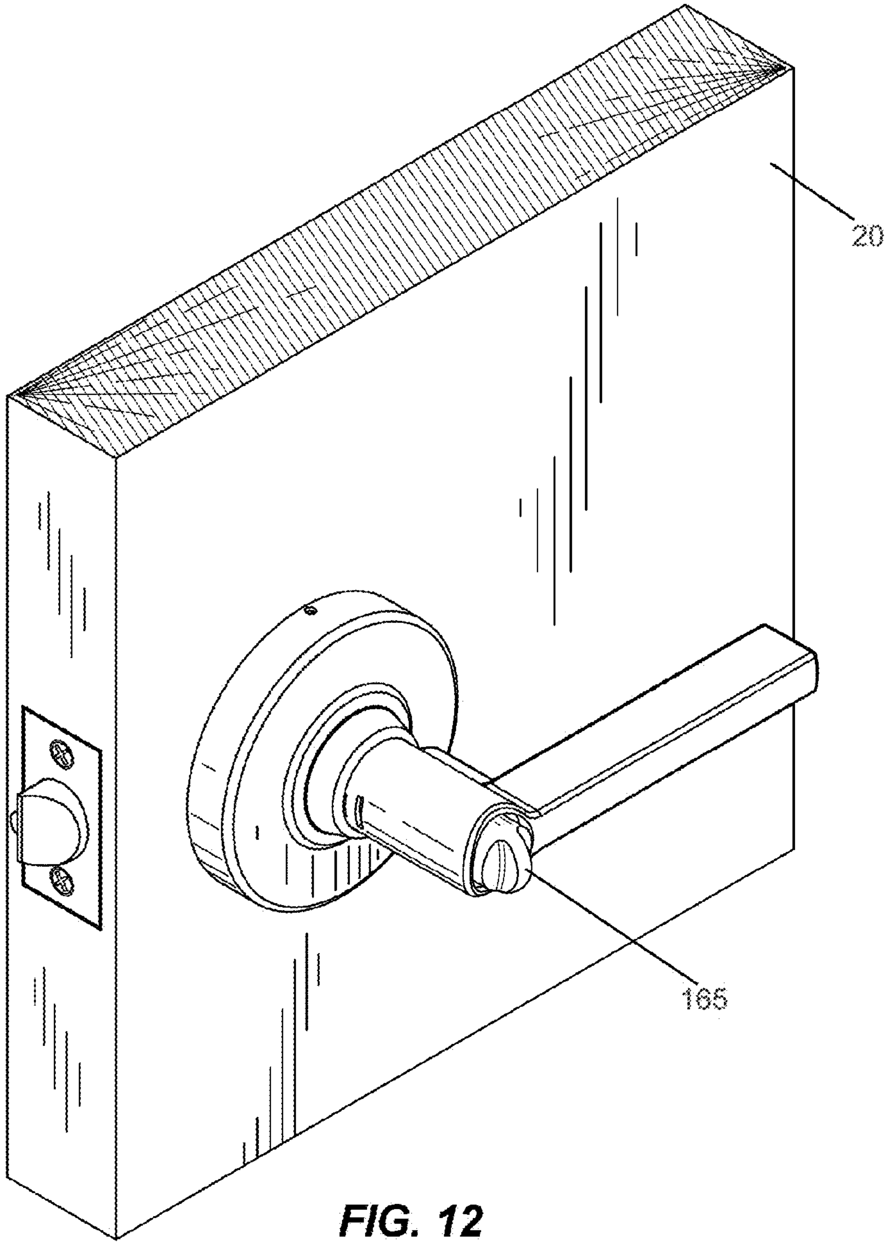
FIG. 12 is a perspective view of the lockset of FIG. 1 assembled in the door and shown from the opposite side of the door as FIG. 1.

Referring to FIG. 11*d*, when the handle is released, the inside handle spring (not shown) returns the latch spindle 200 to a neutral position. As the latch spindle 200 rotates back to the neutral position, the notches 252 in the base 244 of the first cam 240 align with the bottom lances 228 of the latch spindle 200. Concurrently, the side lances 220 engage the first margins 256 of the first cam 240 and force the first cam 240 downward due to contact between the angled notches 298 and the declinations 264, as shown in FIGS. 11*e*, 11*f*, and 11*g*. The biasing spring 184 pushes the locking bar 144 against the slopes 294, imparting a counterclockwise force on the second cam 290 to further force the first cam 240 against the side lances 220 of the latch spindle 200, which in turn forces the notches 252 of the first cam 240 to engage the bottom lances 228. Once the angled notches 298 are no longer engaged with the declinations 264, the locking bar 144 rotates the second cam 290 (through contact with the slopes 294, see FIG. 11*h*) and fully engages the slots 216 in the latch spindle 200 and the depressions 272 of the first cam 240, unlocking the mechanism 100 as illustrated in FIG. 11*i*.

A locking mechanism with egress release eliminates the need for the user to unlock the door during normal daily activity and allows entrance and exiting without concern for being locked out. Integrating the egress function with the locking mechanism also minimizes the number of parts required in the lockset. In addition, releasing the locking mechanism upon egress at approximately the same angle of operation of the inside handle, whether a knob or a lever, for both clockwise and counterclockwise rotation, assures that the locking mechanism will perform as expected for both a right-handed and a left-handed door installation.

Various features and advantages of the invention are set forth in the following claims.

We claim:

1. A locking mechanism for a door, the locking mechanism comprising: an outside actuator; an inside actuator; a housing removably fixed to the door; a locking bar selectively engageable with the housing; a first cam member operable to move the locking bar from an unlocked position wherein the locking bar is released from the housing and a locked position wherein the locking bar is fixedly coupled to the housing a spindle rotatably coupled to the inside actuator, selectively coupled to the outside actuator, and separate from the locking bar; and a second cam member coupled to the first cam member and to the spindle and operable to move the locking bar from the locked position to the unlocked position in response to rotation of the inside actuator from a neutral position to one of a first clockwise position and a second counterclockwise position, wherein the spindle includes a protruding lance that is fixed with respect to the spindle, wherein the protruding lance extends radially inwards towards the interior of the spindle, and wherein the second cam member includes a notch configured to mate with the protruding lance for co-rotation therewith.

2. The locking mechanism of claim 1, wherein the rotational angle of the first clockwise position from the neutral position and of the second counterclockwise position from the neutral position are approximately equal.

3. The locking mechanism of claim 1, wherein the rotational angle of the first clockwise position from the neutral position is from approximately 20 degrees to approximately 30 degrees and wherein the rotational angle of the second counterclockwise position from the neutral position is from approximately 20 degrees to approximately 30 degrees.

4. The locking mechanism of claim 1, wherein the first cam is rotatable to the unlocked position in response to operation of the second cam member.

5. The locking mechanism of claim 1, wherein a turn button is disposed in the inside actuator and wherein the locking mechanism further includes a plunger bar coupled to the turn button and the first cam member, wherein the first cam member is rotatable to the unlocked position in response to movement of the turn button.

6. The locking mechanism of claim 1, wherein a lock cylinder is disposed in the outside actuator and wherein the locking mechanism further includes a plunger bar coupled to the lock cylinder and to the first cam member, wherein the first cam member is rotatable to the unlocked position in response to rotation of the lock cylinder.

7. The locking mechanism of claim 1, wherein the spindle is rotatably coupled to the outside actuator when the locking bar is fixedly coupled to the housing.

8. The locking mechanism of claim 1, wherein the first cam member further includes a sloped surface that translates the locking bar from the unlocked position to the locked position.

9. The locking mechanism of claim 1, further including a biasing spring to bias the locking bar toward the unlocked position.

10. The locking mechanism of claim 1, wherein the second cam member includes a ledge and is further configured to maintain the locking bar in the locked position.

11. A locking mechanism for a door, the door having an inside actuator, the locking mechanism comprising: a housing; a locking bar selectively moveable between a locked position wherein the locking bar is fixedly coupled to the housing and an unlocked position wherein the locking bar is released from the housing;

a turn button disposed in the inside actuator; a plunger bar coupled to the turn button; a first cam member coupled to the plunger bar and including a sloped surface that translates the locking bar from the unlocked position to the locked position in response to movement of the turn button;

a second cam member selectively engageable with the first cam member and the inside actuator to move the locking bar from the locked position to the unlocked position in response to rotation of the inside actuator about a rotational axis from a neutral position to one of a first clockwise position and a second counterclockwise position, wherein the inside actuator includes a protruding lance offset from the rotational axis, wherein the protruding lance extends radially inwards towards the rotational axis, and wherein the second cam member includes a notch configured to mate with the protruding lance for co-rotation with the inside actuator.

12. The locking mechanism of claim 11, wherein the rotational angle of the first clockwise position from the neutral position and of the second counterclockwise position from the neutral position are approximately equal.

13. The locking mechanism of claim 11, further including a biasing spring to bias the locking bar toward the unlocked position.

14. The locking mechanism of claim 11, wherein the housing includes a pair of opposing slots that fixedly couple the locking bar to the housing.

15. The locking mechanism of claim 11, wherein the second cam member further includes an arcuate wall having a ledge configured to maintain the locking bar in the locked position.

* * * * *